United States Patent [19]
Gorin

[11] 3,729,551
[45] Apr. 24, 1973

[54] CONVERSION OF CALCIUM SULFATE TO CALCIUM OXIDE AND ELEMENTAL SULFUR

[75] Inventor: Everett Gorin, Pittsburgh, Pa.

[73] Assignee: Consolidated Coal Company, Pittsburgh, Pa.

[22] Filed: Jan. 7, 1971

[21] Appl. No.: 104,694

[52] U.S. Cl. ................ 423/638, 423/542, 423/566
[51] Int. Cl. ........................................... C01b 17/44
[58] Field of Search ................. 23/137, 177, 186, 23/224, 227

[56] References Cited

UNITED STATES PATENTS

| | | | |
|---|---|---|---|
| 3,582,276 | 6/1971 | Campbell et al. | 23/186 X |
| 3,607,068 | 9/1971 | Campbell et al. | 23/224 |
| 3,607,045 | 9/1971 | Wheelock | 23/186 |
| 3,495,941 | 2/1970 | Van Helden | 23/226 |

FOREIGN PATENTS OR APPLICATIONS

| | | | |
|---|---|---|---|
| 673,402 | 1/1930 | France | 23/226 |
| 149,662 | 11/1928 | Great Britain | 23/177 |
| 14,628 | 6/1912 | Great Britain | 23/226 |
| 3,994 | 1906 | Great Britain | 23/177 |

*Primary Examiner*—G. O. Peters
*Attorney*—D. Leigh Fowler, Jr. and Stanley J. Price, Jr.

[57] ABSTRACT

$CaSO_4$ is converted to CaO in two stages, the first a reduction stage wherein a fluidized bed of relatively coarse $CaSO_4$ is converted to CaS by means of relatively fine, ash-containing hydrocarbonaceous solids and air circulating through the bed, and the second, an oxidation stage wherein the CaS from the first stage is converted to CaO and $SO_2$. In a preferred embodiment, the reduction stage is operated to yield sufficient reducing gas to convert the $SO_2$ from the oxidation stage to elemental sulfur.

1 Claim, 4 Drawing Figures

Patented April 24, 1973

INVENTOR.
EVERETT GORIN

INVENTOR.
EVERETT GORIN

INVENTOR.
EVERETT GORIN

CONVERSION OF CALCIUM SULFATE TO CALCIUM OXIDE AND ELEMENTAL SULFUR

BACKGROUND OF THE INVENTION

1. Field of the Invention

This invention relates to an improvement in the two-stage process for converting $CaSO_4$ to $CaO$. The two-stage process comprises first the reduction of $CaSO_4$ to $CaS$, and then the oxidation of $CaS$ to $CaO$ and $SO_2$.

2. Description of the Prior Art

Illustrative of the prior art with respect to the two-stage process for converting $CaSO_4$ to $CaO$ is British Pat. No. 643,479. One of the primary objects of the patentees is to produce $SO_2$ in addition to the $CaO$. From the standpoint of pollution control, it is preferable to convert the $SO_2$ to elemental sulfur. Such a conversion can be effected by reaction of the $SO_2$ with $H_2S$ pursuant to the well-known Claus reaction. It is also known that $H_2S$ can be made from $SO_2$ by reaction of $SO_2$ with reducing gases. Illustrative of the prior art relating to such a reaction is British Pat. 1,116,129.

SUMMARY OF THE INVENTION

The present invention, in its broadest aspects, provides, in a first zone, for the reduction of $CaSO_4$ to $CaS$ in a fluidized bed of the $CaSO_4$ by means of ash-containing hydrocarbonaceous solids, and, in a second zone, for the oxidation of $CaS$ to $CaO$ and $SO_2$ by means of air. The ash-containing hydrocarbonaceous solids used in the first zone are finer in size than are the fluidized $CaSO_4$ particles. They are carried into the first zone by air which partially burns them in the first zone to provide a reducing gas, as well as sufficient heat to achieve the desired reduction temperature while maintaining it below the fusion temperature of the ash contained in the hydrocarbonaceous solids. The finely divided ash, in the form of carbon-depleted particles, is carried out overhead by the effluent gas, while the coarser $CaS$ is withdrawn separately for transfer to the second zone. For complete conversion of the $CaSO_4$ to $CaS$ in the first zone, the relative proportions of air, hydrocarbonaceous solids and $CaSO_4$ must be regulated so that the $CO/CO_2$ ratio in the outlet effluent gas from the first zone is greater than 0.02 and preferably greater than 0.05. The $CaS$ in the second zone is reacted with air to thereby convert the $CaS$ to $CaO$ and $SO_2$.

In the preferred embodiment of the present invention, sufficient excess reducing gas is produced in the first zone to reduce the $SO_2$ produced in the second zone to elemental sulfur. This is accomplished by regulating the relative proportions of air, hydrocarbonaceous solids and $CaSO_4$ in the first zone so that the $CO/CO_2$ ratio in the outlet gas from the first zone is greater than 0.25 and preferably greater than 0.5.

DESCRIPTION OF THE INVENTION IN ITS BROADEST ASPECTS

Figure 1:
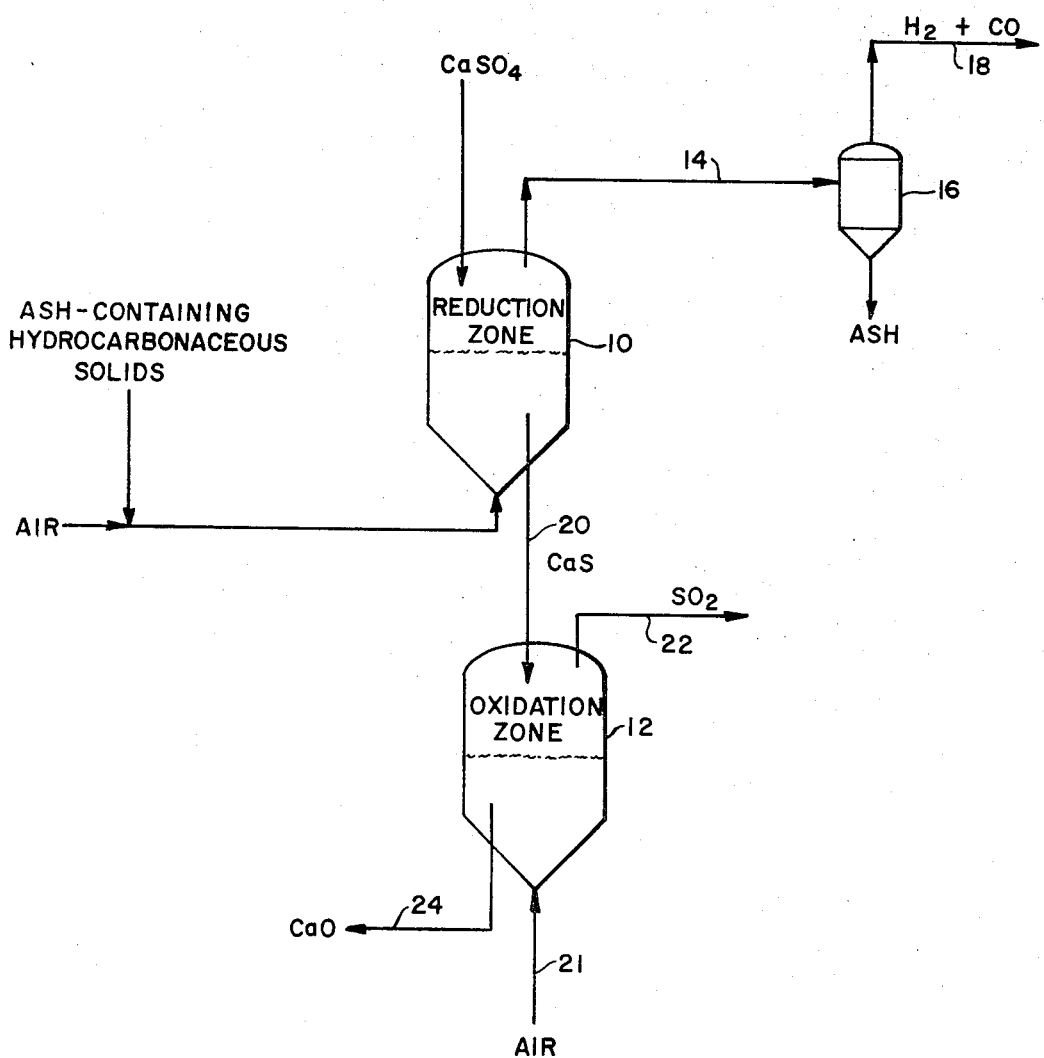
FIG. 1 is a schematic flowsheet illustrating the process of the present invention in its broadest aspects.

Referring to FIG. 1 of the drawings, the process of the present invention is illustrated in its broadest aspects. Numerals 10 and 12 designate the Reduction Zone and the Oxidation Zone respectively, which are required for the conversion of $CaSO_4$ to $CaO$ in two stages. $CaSO_4$, ash-containing hydrocarbonaceous solids, and air are fed to the Reduction Zone 10 as shown. The $CaSO_4$ is maintained as a dense fluidized bed of solids in the Reduction Zone by means of the air at appropriate velocities. The relative sizes of the $CaSO_4$ particles and the hydrocarbonaceous solids are selected so that the $CaS$ produced therein may be readily separated from the carbon-depleted hydrocarbonaceous solids by the gas flowing through the zone. The $CaSO_4$ is the coarser of the two solids so that the ash-containing solids are preferentially removed with the effluent gas, while the $CaS$ is conveniently withdrawn from the fluidized bed in the Reduction Zone.

The Reduction Zone is maintained at a temperature between 1,550° and 1,900° F., preferably between 1,800° and 1,875° F. The selected temperature must be below the fusion temperature of the ash in the hydrocarbonaceous solids. The pressure is not critical. However, it is desirable to maintain the same pressure throughout the Reduction Zone and the Oxidation Zone, for convenience of operation. The reduction of $CaSO_4$ to $CaS$ is an endothermic reaction. The necessary heat to achieve the desired reduction temperature is supplied by combustion of the hydrocarbonaceous solids, but with insufficient air to burn all the solids. Sufficient hydrocarbonaceous solids are fed to the zone to provide not only the carbon required to supply the heat, but also the carbon required for the reduction of the $CaSO_4$ to $CaS$. To assure complete reduction to $CaS$, the relative proportions of air, hydrocarbonaceous solids and $CaSO_4$ must be regulated to yield an effluent gas in which the $CO$ to $CO_2$ ratio is greater than 0.02 and preferably greater than 0.05. This effluent gas is transferred by a conduit 14 to a cyclone separator 16 which drops out ash and discharges ash-free gas through a conduit 18.

The $CaS$ produced in the Reduction Zone 10 is withdrawn and conducted through a conduit 20 without intentional cooling to the Oxidation Zone 12 for conversion to $CaO$ and $SO_2$. The latter zone is maintained at a higher temperature than that maintained in the Reduction Zone, and generally lies in the range of 1,850° to 2,000° F. The pressure is not critical, but is preferably the same as that in the Reduction Zone, for practical convenience. The oxidation of $CaS$ to $CaO$ and $SO_2$ is effected by air (introduced through conduit 21). Preferably, but not necessarily, in contrast to the Reduction Zone, the Oxidation Zone may be a fluidized bed of solids. The reaction is an exothermic one and generally requires cooling to maintain the desired temperature. Any conventional means may be employed for this purpose. Other means may also be employed as will be more fully discussed in connection with the description of the preferred embodiment of this invention. Preferably, a deficiency of air is used so that some CaS is always present in the Oxidation Zone. By so doing, oxygen-free $SO_2$ may be recovered from the Oxidation Zone through conduit 22. The desired CaO is withdrawn through conduit 24.

DESCRIPTION OF THE PREFERRED EMBODIMENT

Figure 2:
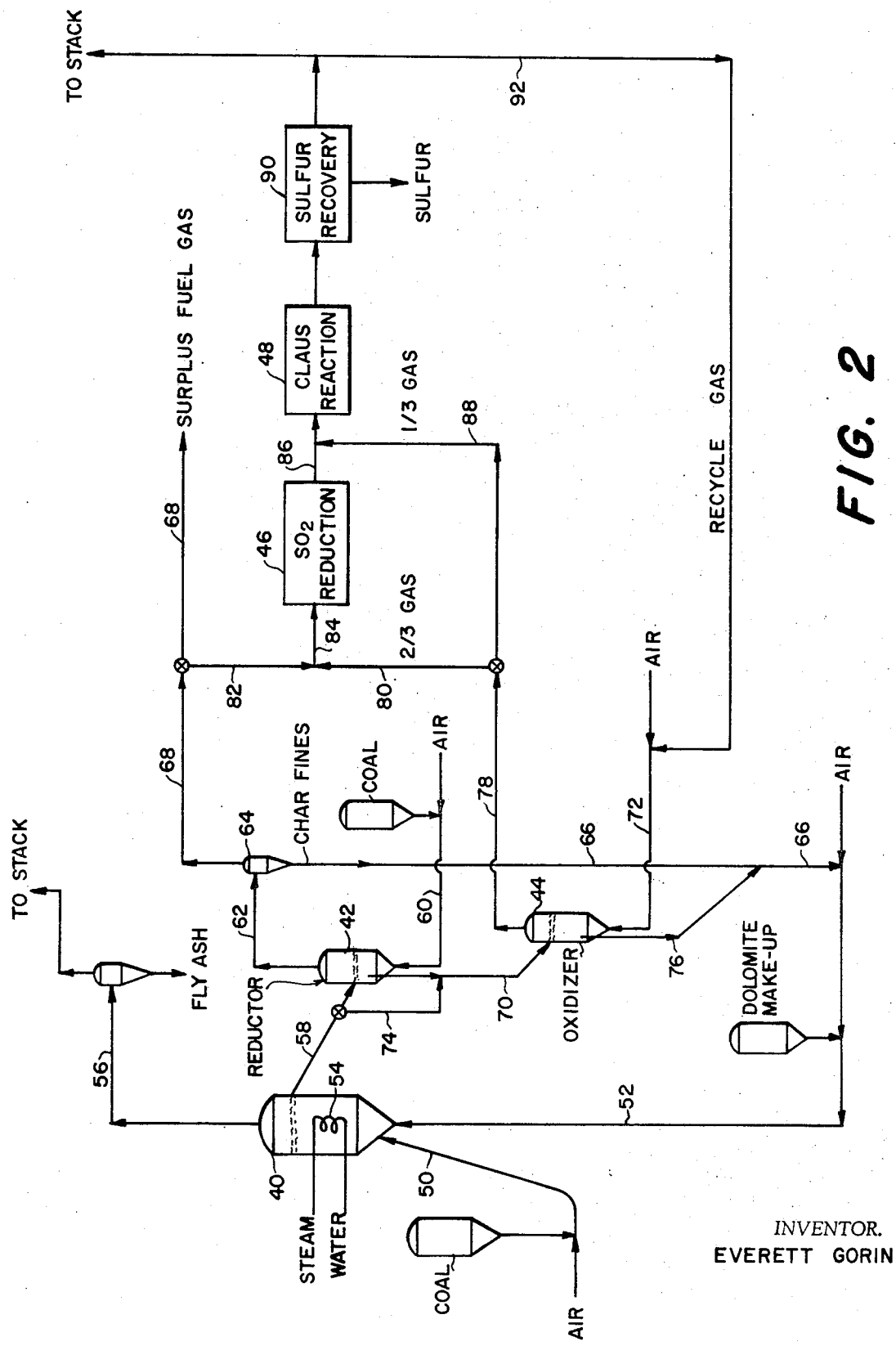
FIG. 2 is a schematic flowsheet of a preferred embodiment of the present invention.

In FIG. 2 of the drawings, the preferred embodiment of the present invention is illustrated in connection with its application to the regeneration of $CaSO_4$ that has been formed in a coal combustion zone by the reaction of $SO_2$ and CaO in the presence of excess air. In this preferred embodiment, the relative proportions of air, hydrocarbonaceous solids, and $CaSO_4$ in the reduction zone are regulated so that, not only is the $CaSO_4$ converted to CaS, but also sufficient excess reducing gas is produced to reduce the $SO_2$ produced in the oxidation zone to elemental sulfur. There are five essential vessels in this preferred embodiment, namely; a boiler 40 which houses a fluidized combustion zone; a reductor 42 and an oxidizer 44 of a regeneration system for converting $CaSO_4$ to CaO, both adapted to contain fluidized beds of solids; an $SO_2$ reduction vessel 46; and finally, a vessel 48 for confining a Claus reaction zone for converting $SO_2$ and $H_2S$ to elemental sulfur.

Starting with the boiler 40, coal is carried through a conduit 50 into a fluidized bed of dolomite (CaO·MgO) which is confined in the boiler. Excess air (105 to 125 percent of the stoichiometric), together with regenerated and make-up dolomite, is introduced into the boiler through a conduit 52. The dolomite is maintained as a fluidized bed in the boiler by means of the air moving at a fluidizing velocity. The dolomite is coarser in size than the coal. The latter is burned in the boiler at a temperature between about 1,400° and 1,900° F. to supply heat to a steam coil 54 which is immersed in the fluid bed. The fly ash resulting from the combustion, along with stack gas essentially free of $SO_2$, is discharged through conduit 56 and then to stack after ash removal. The $SO_2$ and CaO react in the bed of dolomite in the presence of excess air as follows:

(1) $CaO + SO_2 + \frac{1}{2} O_2 = CaSO_4$

A mixture of $CaSO_4$ and unreacted dolomite is withdrawn from the fluidized bed in the boiler near the top of the bed. This mixture is conducted through a conduit 58 into the reductor 42. Air and coal are also introduced into the reductor by means of a conduit 60. If a caking coal is used, it may be necessary to preoxidize it to render it sufficiently non-caking for operative use in the fluidized bed in the Reduction Zone. The relative proportions of air, coal and $CaSO_4$ are regulated to produce enough reducing gas to reduce the $SO_2$ from the oxidizer. To achieve such a result, the effluent gas from the reductor 42 must contain CO and $CO_2$ in a ratio greater than 0.25 and preferably greater than 0.5. The temperature and pressure maintained in the reductor are those recited in connection with the description of FIG. 1.

The velocity of the air through the bed of $CaSO_4$ in the reductor is regulated to maintain it in a fluidized state. The size of the coal introduced as the reductant is smaller than that of the $CaSO_4$. Upon partial combustion, the partially carbon-depleted coal (sometimes called char) is carried out of the vessel by the reducing gas through a conduit 62 to a cyclone separator 64 which separates the reducing gas from the char fines. The latter may be recycled through a conduit 66 to the air inlet conduit 52 for return to the boiler vessel 40. The separated reducing gas is withdrawn from the cyclone separator 64 through a conduit 68 for use in the $SO_2$ conversion to S, as will be later described.

The CaS formed in the reductor 42 is withdrawn through a conduit 70 which leads to the oxidizer 44. The CaS is maintained in a fluidized state by means of air and recycle gas which is introduced into the oxidizer by a conduit 72. The recycle gas serves to reduce the $SO_2$ partial pressure and thus provide a driving force for the $SO_2$ emission. It also serves as a temperature control by absorbing heat. The temperature and pressure maintained in the oxidizer are those previously recited in connection with the description of FIG. 1. A deficiency of air is used to assure an oxygen-free $SO_2$ in the effluent gas.

The temperature in the oxidizer 44 may also be regulated by introducing some $CaSO_4$ directly into the oxidizer through a by-pass conduit 74 which joins conduits 58 and 70. This $CaSO_4$ reacts endothermically with CaS to form CaO and $SO_2$, and thus helps to offset the exothermicity of the CaS oxidation reaction.

The effluent gas from the oxidizer 44 is removed through a conduit 78 which leads to a valved junction for splitting this $SO_2$ gas into two streams, one containing two-thirds of the gas and the other the remaining one-third. A conduit 80 conducts the two-thirds stream to combine with a stream of reducing gas in the proper amount conveyed by a conduit 82 from the conduit 68. Surplus reducing gas, if any, is exhausted through conduit 68. The combined stream of $SO_2$ and reducing gas is conducted by a conduit 84 to the $SO_2$ reduction vessel 46 for conversion to COS and $H_2S$ as follows:

(2) 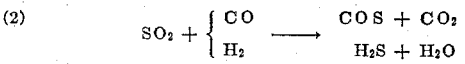

For this reaction, temperatures in the range of 600°–1,000° F. are normally adequate. Either a highly active alumina catalyst alone, or an alumina or bauxite catalyst promoted with active metals such as Cu or Fe may be used.

The product stream from this vessel is withdrawn through a conduit 86 wherein it is combined with the one-third part of the $SO_2$ stream carried by a conduit 88. This combined stream is subjected to the Claus reaction in vessel 48 to form elemental sulfur as follows:

(3) 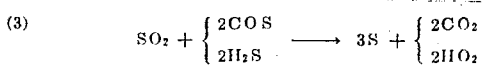

For the Claus reaction, the temperature is generally between 400° and 500° F., and a standard activated alumina or bauxite catalyst is used. If desired, a second-stage Claus reactor may be used at a lower temperature, that is, below 400° F., to complete the conversion after recovery of sulfur from the first stage.

The vaporous sulfur is condensed in a sulfur recovery vessel 90. The product gas may, in part, be sent to stack while part is recycled by a conduit 92 to assist in temperature control in the oxidizer 44.

EXPERIMENTAL

Figure 3:
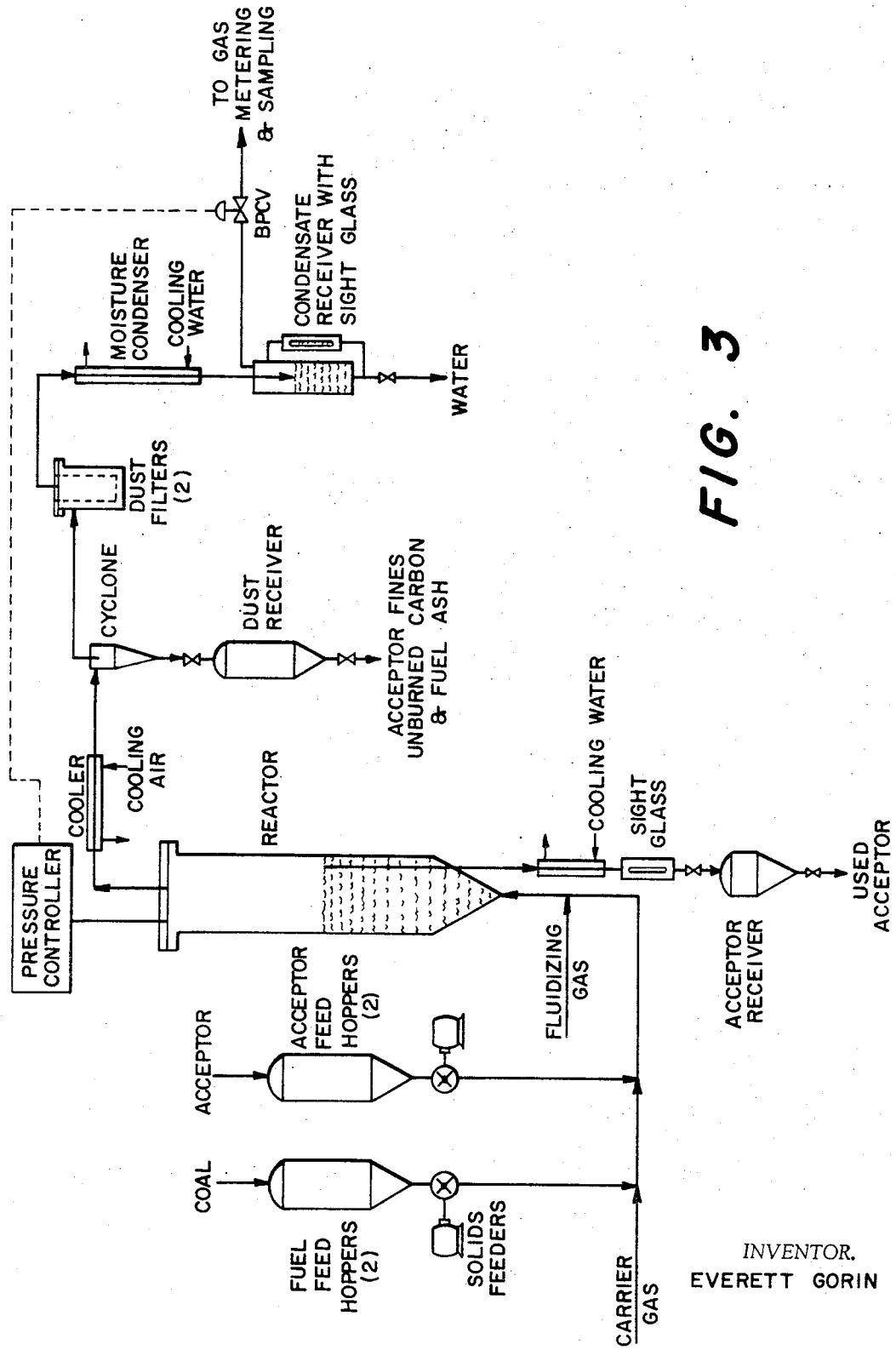
FIG. 3 is a simplified flow diagram of the equipment used in the experimental studies associated with the development of the process of the present invention.

A schematic diagram of the equipment used in the experimental studies is shown in FIG. 3, and is self-explanatory. The acceptor referred to is dolomite (CaO·MgO), 16 × 28 mesh.

The reactor was 4 inches I.D. made from Type 316 stainless steel. The fluidized bed height was controlled at 36 inches by means of an overflow weir. All solids were fed to the apex of the cone which had an included angle of 40°. The same reactor was used for all steps of the process, including coal preoxidation, i.e., no attempt was made to operate all steps simultaneously.

After reaching the programmed flows and bed temperature, solids feeding was continued for three bed inventory changes and the data were recorded over a subsequent 1-hour balance period. By adjusting the electrical power input to each of three sections of the reactor heater (not shown), the maximum temperature gradient across the fluidized bed was held to within 20° F. at all times.

The data workup was based on measured values for the input and output streams, the dry exit gas rates, product gas analyses, and the acceptor compositions as determined by a special assay for the CaS and $CaSO_4$ content. In the first-stage (i.e., reduction) runs, considerable sulfur was rejected to the gas through the reaction:

(4) $3 CaSO_4 + CaS = 4 CaO + 4 SO_2$

At the conditions used, most of the $SO_2$ thus formed was reduced to $S_2$ which condensed as fog in the gas recovery system and escaped with the product gas. The amount of elemental sulfur formed was obtained by a forced sulfur balance.

RESULTS AND DISCUSSION

Preoxidation of Coal Feed

All work reported here was carried out with Ireland Mine coal, a high sulfur, highly caking Pittsburgh seam coal. Early work on feeding raw coal to stage 1 showed that this was not practical due to a small amount of coke formation. Accordingly, it was found necessary to preoxidize the feed coal to reduce its caking propensity.

A level of preoxidation of 5.3 weight percent (defined as pound of oxygen reacted with 100 pounds Moisture-Free coal) was found sufficient to prevent coke formation. The preoxidation was carried out by continuous feed of raw coal (28 × 100 mesh) to a fluidized bed at 700° F. A mixture of air and nitrogen was used as fluidizing gas. The composition of the preoxidized coal is given below:

| | |
|---|---|
| Hydrogen | 4.52 Wt. %, MF basis |
| Carbon | 72.44 |
| Nitrogen | 1.29 |
| Oxygen (by diff.) | 6.71 |
| Sulfur | 4.34 |
| Ash | 10.70 |

Gross Btu, MF basis, by Dulong formula — 12,995 Btu/lb.

Stage 1 (Reduction) Runs

After preliminary runs were made to determine the extent of preoxidation required, a series of runs were made with the above preoxidized coal. Five runs were made with fresh sulfated acceptor at 1,825° and 1,875° F. and at various input acceptor, coal and air rates. Another run to help determine any kinetic effects of acceptor activity loss on the rate of $CaSO_4$ reduction was made with an acceptor exposed previously to seven combustion-regeneration cycles. Run conditions and results are shown in Table I below.

The objective of these runs was to determine conditions under which three simultaneous conditions could be satisfied, nearly complete reduction to CaS, a ratio of $CO + H_2/CaS = 2$ in the product, and process heat balance. For each run, a complete heat balance was calculated with the results shown in the last row of Table I. The heat balance was based on air and preoxidized coal fed to the process at 100° and 700° F., respectively.

Comparisons of Runs A and B and Runs D and E show that, by increasing the temperature, the desired ratio, $(CO + H_2)/$(total S in acceptor product), can be easily achieved. Substantially complete reduction of $CaSO_4$ occurred in all the fresh acceptor runs, showing that the reduction reactions are rapid at temperatures of 1,825° F. and above, even with $(CO + H_2)$ concentrations as low as 9.9 percent in the exit gas, as in Run C. The acceptor retention times in these runs ranged from 0.8 to 1.1 hours. In run F, made with deactivated acceptor, the somewhat lower level of $CaSO_4$ reduction may have been caused by the decreased retention time brought about by the increased acceptor feed rate which was used in order to keep the $CaSO_4$ input roughly comparable with those in the other runs. Thus, deactivation has no obvious effect on the rate of $CaSO_4$ reduction.

No deposits of any kind were found, nor was there evidence of ash slagging in any of the runs.

In none of the runs was process heat balance achieved simultaneously with the desired ratio, $(CO + H_2)/$total sulfur = 2. Four of the six runs were strongly exothermic. Calculated process conditions which lead to thermoneutrality and a $(CO + H_2)/$total sulfur ratio of two are shown in Table II. For the process calculations, a carbon burnout of 70 percent (vs. 60.3 percent in Run A) was assumed, to allow for the effects of a deeper fluidized bed. The process calculations show that the following $CaSO_4$/coal/air ratios will be required:

Coal/$CaSO_4$ = 72 lb. coal/mol. $CaSO_4$ fed. Air/Coal = 27 SCF/lb. coal.

The breakdown of the total oxygen required at process conditions is:

| | |
|---|---|
| Air | 33 percent |
| Coal | 4 percent |
| $CaSO_4$ | 63 percent |

The air requirement corresponds to 22 percent of stoichiometric air for combustion of the 5 percent preoxidized Ireland Mine coal.

Stage 2 (Oxidation) Runs

The feedstock used for these runs was, for experimental convenience, prepared by reducing the $CaSO_4$ to CaS using CO both as a fuel and reductant at 1,750° F. Part of the CO was burned with air to provide the preheat duty for the incoming gas and solids. In the second stage, a portion of the incoming CaS is oxidized as follows:

(5) $CaS + 2 O_2 = CaSO_4$

The $CaSO_4$ reacts with residual CaS, thereby rejecting sulfur. The overall reaction is highly exothermic and provides sufficient preheat duty for the incoming air and diluent recycled tail gas. During the program, about twice as much diluent ($N_2$) was used as is required for process heat balance in order to provide a conservative $\Delta P$ $SO_2$ driving force. Run conditions and results are shown in Table III.

In Run H, the input air rate was varied to determine the $O_2$ requirement which gives the optimum sulfur rejection at 1,950° F. The optimum conditions appear to be about 95 percent of the theoretical $O_2$ needed to reject all the sulfur. At higher $O_2$ inputs, the product acceptor contains $CaSO_4$.

It is not clear whether the lower level of sulfur rejection in Run G at 1,900° F. was caused by lower reaction rates or by inhibition due to the lower $\Delta P$ $SO_2$ driving force.

Small deposits caused by the $CaSO_4$—CaS transient liquid occurred in all the runs. In Run H, the extent of deposit formation was 0.6 percent of the acceptor fed.

After repeated combustion-regeneration cycles, it is likely that the extent of deposit formation will decrease drastically, and the deposit problem can be tolerated by periodic shutdowns for descaling the reactor walls.

Sulfur Recovery

This is accomplished by blending the regeneration off-gases from the two stages such that the ratio of $(CO + H_2 + H_2S + COS)/SO_2$ is equal to, or slightly greater than, two. The gas is first passed through a catalytic reductor. Small amounts of "trimming" air may be added to the feed gas so that the product gas from the reductor step constitutes a proper feed to a multistage Claus plant. The equilibria are so favorable that substantially no CO or $H_2$ remain in the product gas. The Claus feed gas now contains a ratio of $$(H_2S + COS)/SO_2 = 2$$

Figure 4:
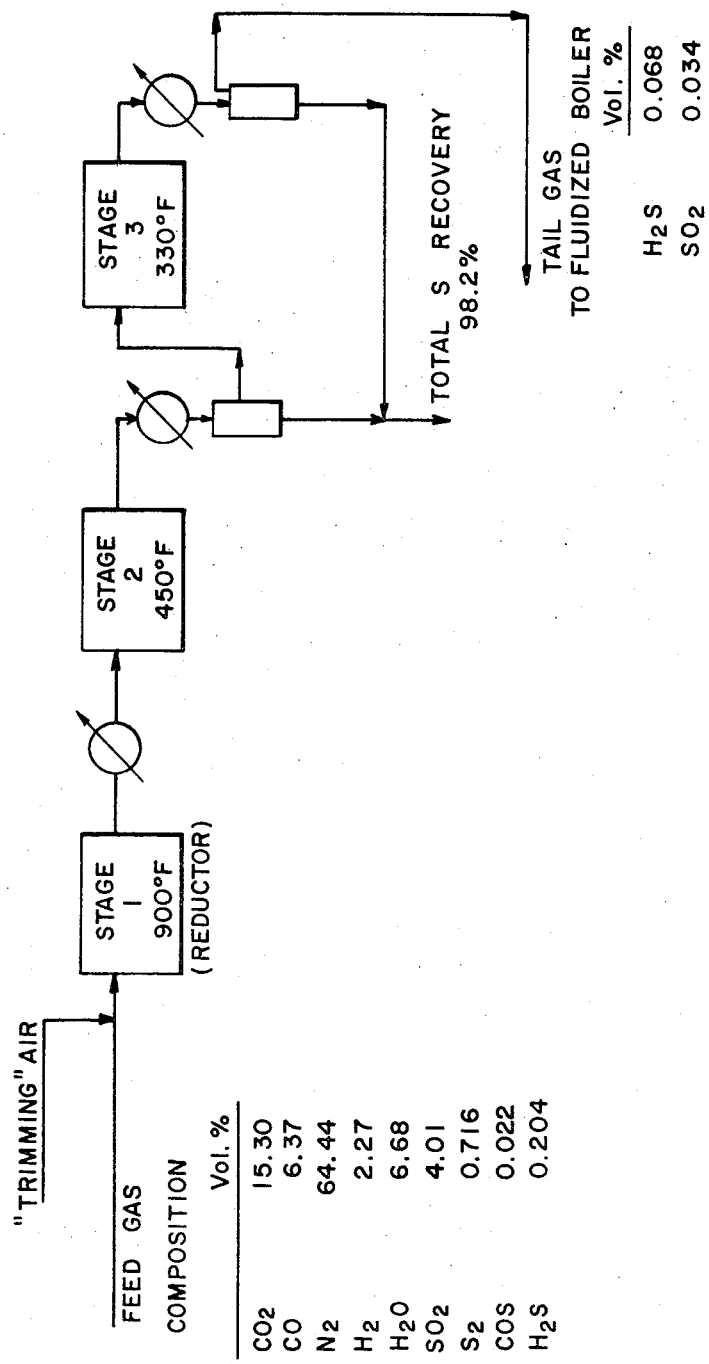
FIG. 4 is a block diagram of the sulfur recovery system used for thermodynamic analysis.

A schematic flow diagram of the sulfur recovery system is shown in FIG. 4 along with a typical feed gas composition.

A thermodynamic analysis of the sulfur recovery system was made with the basic premises given below.

Equilibrium is assumed to be established in all stages with respect to the following reactions:
a. $CO + \frac{1}{2} S_2 = COS$
b. $H_2 + \frac{1}{2} S_2 = H_2S$
c. $2 H_2 + SO_2 = \frac{1}{2} S_2 + 2 H_2O$
d. $2 CO + SO_2 = \frac{1}{2} S_2 + 2 CO_2$
e. $3 S_8 = 4 S_6$
f. $S_8 = 4 S_2$ The equilibrium relationships in the above six reactions, at a given temperature and pressure along with the four elemental balances, completely define the system in each stage.

Experimental data obtained in our laboratories and by others show that, at least under laboratory conditions, it is very easy to establish equilibrium in all of the above reactions even at very low temperatures provided an active alumina catalyst is employed.

It is necessary, in order to maintain catalyst activity, to operate above the dew point of the sulfur to prevent its deposition on the catalyst. Each stage was operated, therefore, such that the vapor pressure of sulfur at the outlet temperature was 20 percent greater than its partial pressure in the outlet gas. Sulfur is condensed from the product gas from each stage before feeding the gas to the succeeding stage.

A computer program was set up using an iterative trial and error procedure to solve for sulfur recovery and product gas compositions with the above restraints imposed on the system.

The free energy data for reactions (a), (b), (c) and (d) were taken from the Janaf Tables, Dow Chemical Co., Clearinghouse for Federal Scientific and Technical Information, U. S. Department of Commerce. Experimental data of Preuner and Schupp, Ziet. Physik, Chem., 68:129 (1909) were used to define the equilibrium constants for reactions (e) and (f).

The outlet temperatures from each stage for the illustrative example given are shown in FIG. 4. The total sulfur recovery potential is 98.2 percent. Addition of a fourth stage operated at 270° F. increases the potential sulfur recovery to 99.3 percent.

Energy and Raw Material Requirements

The relative energy and raw material requirements were evaluated for the two types of fluidized boiler operations using once-through dolomite and acceptor regeneration with sulfur recovery, respectively. The evaluation is based on the following process conditions:

| | |
|---|---|
| Sulfur in coal | = 4.5% |
| Removal of $SO_2$ from stack gas | = 90% |
| Equilibrium acceptor activity | = 0.41, equivalent to 8% make-up rate |
| Second stage | = 1,950° F. |
| Fluidized boiler | = 1,800° F. |
| Sulfur recovery section; first reactor | = 900° F. |

The comparison between the two systems is given in Table IV. The net difference in material costs between the once-through and regeneration process, about $1.90 per ton coal burned in the boiler, is a powerful incentive for the adoption of the two-stage regeneration process.

TABLE I

Conditions and results for first-stage runs. Fuel: 5.3% preoxidized Ireland Mine coal. System pressure: 8 p.s.i.g.

| Run number | A | B | C | D | E | F |
|---|---|---|---|---|---|---|
| Temperature, °F | 1,825 | 1,875 | 1,825 | 1,825 | 1,875 | 1,825 |
| Acceptor feed:[1] Feed rate, lb./hr | 9.44 | 9.44 | 11.26 | 11.01 | 9.44 | [2] 23.72 |
| Composition of total calcium, mole percent: | | | | | | |
| CaO | 10.50 | 10.50 | 10.50 | 10.50 | 10.50 | 65.50 |
| CaS | 0 | 0 | 0 | 0 | 0 | 0 |
| $CaSO_4$ | 89.50 | 89.50 | 89.50 | 89.50 | 89.50 | 34.50 |
| Coal feed rate, lb./hr | 4.79 | 4.79 | 4.79 | 4.93 | 4.93 | 4.22 |
| Inlet gas, SCFH: | | | | | | |
| Air | 152 | 152 | 152 | 125 | 125 | 139 |
| $N_2$ purges | 3.6 | 3.6 | 3.6 | 3.6 | 3.6 | 3.6 |
| Exit gas rate, SCFH dry gas | 231 | 235 | 232 | 207 | 203 | 218 |
| Exit gas composition at top of bed: | | | | | | |
| $H_2O$, mole percent | 12.72 | 12.06 | 13.80 | 15.07 | 13.76 | 13.61 |
| $H_2$ | 3.88 | 4.65 | 2.71 | 3.98 | 5.88 | 2.20 |

TABLE 1—Continued

| Run number | A | B | C | D | E | F |
|---|---|---|---|---|---|---|
| $CH_4$ | 0.48 | 0.20 | 0.46 | 0.55 | 0.52 | 0.43 |
| CO | 9.79 | 12.30 | 7.21 | 9.29 | 13.02 | 6.58 |
| $CO_2$ | 18.81 | 17.55 | 21.51 | 20.61 | 16.74 | 23.86 |
| $S_2$ | 1.03 | 1.05 | 0.96 | 1.06 | 1.18 | 0.81 |
| $H_2S$ | 0.29 | 0.34 | 0.25 | 0.26 | 0.19 | 0.10 |
| COS | 0.03 | 0.03 | 0.03 | 0.02 | 0.03 | 0.02 |
| $N_2$ (diff.) | 52.97 | 51.82 | 53.07 | 49.16 | 48.68 | 52.39 |
| Product Acceptor: | | | | | | |
| Rate, lb./hr | 6.27 | 6.25 | 7.54 | 7.35 | 6.27 | 20.08 |
| Composition of total calcium, mole percent: | | | | | | |
| CaO | 29.8 | 31.3 | 25.3 | 27.0 | 29.8 | 69.4 |
| CaS | 69.6 | 68.1 | 73.8 | 72.2 | 69.6 | 28.6 |
| $CaSO_4$ | 0.6 | 0.6 | 0.9 | 0.8 | 0.6 | 2.0 |
| Unreacted char, lb./hr | 1.99 | 1.88 | 1.99 | 2.31 | 2.33 | 1.52 |
| Outlet fluidizing velocity, ft./sec | 2.19 | 2.27 | 2.20 | 1.96 | 1.96 | 2.06 |
| Bed density, lb./ft³ | 24.6 | 23.9 | 24.5 | 27.0 | 27.0 | 30.7 |
| Bed weight, lb. | 6.15 | 5.98 | 6.13 | 6.75 | 6.75 | 7.68 |
| Solids retention time, hr. | 0.98 | 0.96 | 0.81 | 0.92 | 1.08 | 0.38 |
| Percent carbon burnout, lb. C gasified/100 lb. C fed | 60.3 | 63.3 | 60.7 | 54.8 | 53.5 | 68.1 |
| Percent S in acceptor rejected to gas | 21.5 | 23.3 | 16.5 | 18.4 | 21.6 | 10.6 |
| Percent reduction, CaS/CaS plus $CaSO_4$, mole ratio | 99.2 | 99.1 | 98.8 | 99.0 | 99.2 | 93.5 |
| Mole ratio, CO plus $H_2$/CaS plus $CaSO_4$ | 2.20 | 2.84 | 1.26 | 1.57 | 2.67 | 0.94 |
| Process heat balance, B.t.u. absorbed/lb. mole $CaSO_4$ fed | −67,700 | −48,400 | −27,400 | −4,840 | +7,800 | −19,200 |

¹ Fresh sulfated dolomite.
² Sulfated dolomite after 7 cycles of regeneration.

Table II

Calculated Process Conditions for Heat Balance in Stage 1

Basis: 1 lb. mole $CaSO_4$

| Input: | Temp. °F | Lbs. | Moles | ΔH (Btu) |
|---|---|---|---|---|
| Preoxidized coal | 700 | 72.45 | - | 17,600 |
| Sulfated Acceptor: | 1800 | | | |
| Inert | | 56.66 | - | 27,210 |
| CaO | | 6.56 | 0.1173 | 2,440 |
| $CaSO_4$ | | 136.14 | 1.000 | 61,070 |
| Air | 100 | 145.4 | 5.032 | 1,400 |
| Heat of reaction (heat formation at 25°C.) ($CaSO_4$)in − (CaO + CaS + $S_2$ + $CO_2$ + CO + $H_2O$)out | | | | 120,570 |
| Total | | | | 230,290 |
| Output: *MAF char | 1850 | 15.74 | | 10,850 |
| Ash | 1850 | 7.74 | | 3,520 |
| Product Acceptor. | | | | |
| Inert | | 56.66 | | 27,990 |
| CaO | | 18.68 | 0.3331 | 7,170 |
| CaS | | 56.13 | 0.7781 | 18,040 |
| $CaSO_4$ | | 0.83 | 0.0061 | 390 |
| Product Gas: | 1850 | | | |
| $H_2O$ | | 21.84 | 1.212 | 43,440 |
| $CO_2$ | | 83.71 | 1.902 | 40,480 |
| CO | | 32.38 | 1.156 | 15,220 |
| $N_2$ | | 111.0 | 3.962 | 52,900 |
| $H_2$ | | 0.83 | 0.412 | 5,080 |
| $S_2$ | | 9.68 | 0.151 | 2,330 |
| Heat Losses | | | | 2,880 |
| Total | | | | 230,290 |

*Moisture-free and Ash-free

TABLE III

Conditions and Results for Second-Stage Runs

| Run Number | G | H (I) | H (II) | H (III) |
|---|---|---|---|---|
| System pressure, psig | 5 | 5 | 5 | 5 |
| Bed Temperature, °F. | 1900 | 1950 | 1950 | 1950 |
| Acceptor, Mole % of Total Calcium | | | | |
| CaS | 73.3 | 72.3 | 72.3 | 72.3 |
| $CaSO_4$ | 2.4 | 1.8 | 1.8 | 1.8 |
| CaO | 24.3 | 25.9 | 25.9 | 25.9 |
| Feed rate, lb/hr. | 4.64 | 4.95 | 4.95 | 4.95 |
| Inlet air, SCFH | 70.5 | 64.4 | 76.4 | 85.5 |
| Inlet $N_2$, SCFH | 147.0 | 130.0 | 127.0 | 129.0 |
| $N_2$ purges, SCFH | 3.6 | 3.6 | 3.6 | 3.6 |
| Exit gas rate, SCFH | 215.0 | 194.0 | 202.0 | 208.0 |
| Exit Gas Composition, Mole % | | | | |
| $N_2$ | 95.76 | 95.21 | 94.63 | 95.52 |
| $SO_2$ | 4.24 | 4.79 | 5.37 | 4.48 |
| Outlet fluidizing velocity, ft./sec. | 2.42 | 2.23 | 2.33 | 2.39 |
| % Sulfur rejected | 82.1 | 79.4 | 93.8 | 80.1 |
| Mole % of Total Calcium in Product | | | | |
| CaO | 86.5 | 84.8 | 94.8 | 85.2 |
| CaS | 7.3 | 14.7 | 4.1 | 2.0 |
| $CaSO_4$ | 6.2 | 0.5 | 1.1 | 12.8 |
| Input $O_2$, % of theoretical | 92.2 | 79.4 | 94.4 | 102.8 |
| Outlet $SO_2$ partial press., atm. | 0.0560 | 0.0632 | 0.0709 | 0.0592 |
| ΔP driving force, atm. | 0.0680 | 0.0978 | 0.0901 | 0.1018 |
| Bed density, lb/ft³ | 21.2 | 22.7 | 21.7 | 22.4 |
| Solids retention time, hr. | 1.22 | 1.25 | 1.21 | 1.15 |

Table IV

COMPARISON OF RELATIVE ENERGY AND RAW MATERIAL REQUIREMENTS IN FLUIDIZED BOILERS

| | With Regeneration and sulfur recovery | Once Through |
|---|---|---|
| Energy as Coal Equivalent Lb/100 lb. coal burned in boiler | | |
| Coal fed to regeneration | 9.16 | -- |
| Sensible heat for fresh dolomite | 0.39 | 1.92 |
| Heat to calcine fresh dolomite | 0.61 | 3.01 |
| Less | | |
| Sensible heat regenerated acceptor | 0.21 | -- |
| Residual char from regeneration burned in boiler | 2.22 | -- |
| Steam and boiler feed water duty from sulfur recovery | 2.20 | -- |
| Net | 5.53 | 4.93 |
| Cost - /Ton Coal Burned | | |
| Incremental coal at $6/ton | +33 | +30 |
| Fresh dolomite at $2.50/ton | +28 | +138 |
| Worth of recovered sulfur at $25/ton | −85 | -- |
| Total Cost | −24 | +168 |
| Relative Cost | 0 | +192 |

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In the two-stage process for the conversion of $CaSO_4$ to CaO wherein $CaSO_4$ is first converted in a reduction zone to CaS by means of a non caking or preoxidized coal and then the CaS is converted in an oxidation zone to CaO and $SO_2$, the improvement which comprises:

a. establishing and maintaining a dense fluidized bed of $CaSO_4$ particles in said reduction zone, b. passing air and the coal into said bed of $CaSO_4$, the relative sizes of said $CaSO_4$ particles and said coal particles being selected so that the CaS particles produced in said reduction zone may be readily separated from the carbon depleted coal particles, by the gas flowing through said zone, the coal particles fed to the zone being of finer size than the $CaSO_4$ particles in said bed.

c. maintaining said reduction zone at a temperature between 1,550° and 1,900° F, which is below the fusion temperature of the ash in said coal, d. regulating the relative proportions of air, coal, and $CaSO_4$ in said reduction zone so that more coal solids are present in said zone than are required to reduce the $CaSO_4$ to CaS, whereby only partial oxidation of the coal is effected by the air, and the effluent gas contains CO and $CO_2$ in a ratio greater than 0.02.

e. removing carbon depleted ash containing coal particles with the effluent gas from said reduction zone, and f. separately withdrawing CaS from said reduction zone for treatment in said oxidation zone.

* * * * *